Sept. 11, 1962  M. ROCA  3,053,538

MAGNETIC GAME

Filed July 31, 1959

INVENTOR.

Miguel Roca.

3,053,538
MAGNETIC GAME
Miguel Roca, 601 W. 172nd St., Apt. 3G, New York, N.Y.
Filed July 31, 1959, Ser. No. 830,826
1 Claim. (Cl. 273—139)

This invention relates to games, and more specifically to fishing games for the purpose of entertainment and enjoyment.

It is an object of the invention to construct a game which may be played with equal enjoyment by two, three or four persons.

Another object of the invention is to construct a game which is simple to operate and understand so that both children and adults may derive equal enjoyment.

It is a further object of the invention to construct a game which consists of components which lend themselves to simple and economic manufacturing techniques.

With these objects in mind the apparatus which has been invented consists of a revolving disc which is covered by a top board representing an ice covered pond. The board contains four holes disposed symmetrically above the outer circumference of the disc. Fishing rods simulated by magnets on the ends of pegs are constructed to enter the holes such that the magnets come in contact with metal pins, representing fish. These pins are symmetrically and removably located around the perimeter of the disc.

The arrangement and different features of construction together with a full explanation as to a preferred method of playing the game will be understood from the following detailed description of the invention when taken in conjunction with the following drawings wherein.

Similar reference characters indicate corresponding parts throughout the several views in the drawing.

Figure 1:
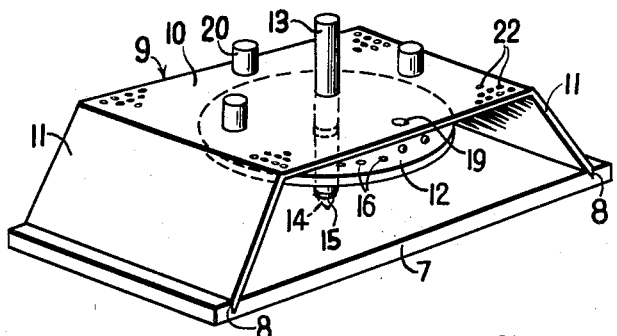
FIG. 1 is a perspective view of a preferred embodiment of the assembled game.
Figures 4, 5:
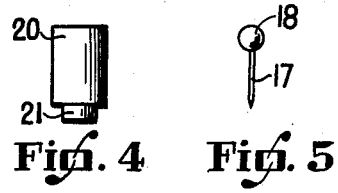
FIG. 4 is a simulated fishing rod.
FIG. 5 is a pin of magnetic material representing a fish.
Figure 2:
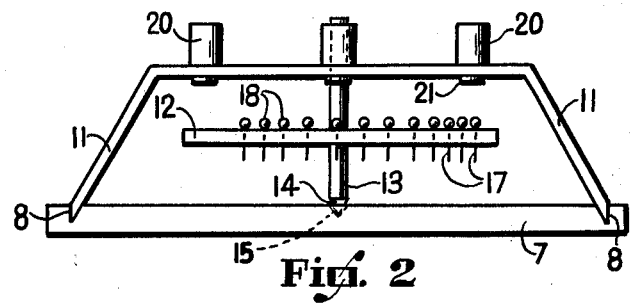
FIG. 2 is a cross sectional elevation of the game.
Figure 6:
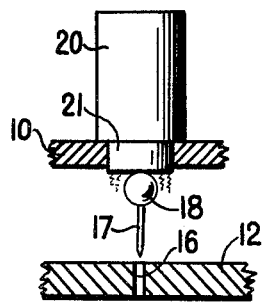
FIG. 6 is a view partly in section of the fishing rod extracting a fish by magnetic force.
Figure 3:
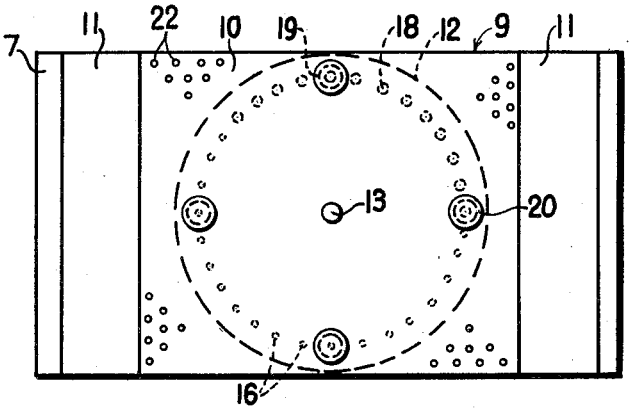
FIG. 3 is a plan view of FIG. 2.

Referring now to the drawing in detail the numeral 7 represents a base board which is rectangular in shape. The board has a groove 8 which is cut into the top surface along each end. A cover 9 which may be constructed from a single sheet of material and consists of a top rectangular section 10 disposed parallel to the base 7 and located centrally above the same. Two side walls or supports 11 project downwardly from each end of section 10 and engage in grooves 8 as shown in FIGS. 1 and 2. A disc 12 is mounted centrally on a shaft 13 and located between the cover 9 and base 10. The shaft 13 has a pivot point 14 at the lower end which rotates in a bearing hole 15 drilled in the centre of the base board 7. The upper end of the shaft 13 projects through a hole in the cover 9 which acts as an upper bearing, thus permitting free rotation of the disc 12. The disc 12 contains thirty two small holes 16 equally spaced around the circumference. These holes are designed to loosely receive pins 17. The pins represent fish and are constructed in the shape of a pin having an enlarged head 18 which is made of a magnetic material. The cover top 10 contains four larger holes 19 located directly above the small holes in the disc and spaced an equal distance from each other such that one hole falls centrally of each side of the cover. These holes 19 represent ice fishing holes and are adapted to receive any four fishing rods 20. The rods 20 have magnets 21 located at one end which may protrude through any of the four holes 19, and in so doing, approach one of the pins 17 and extract it from its location in hole 16 by magnetic force. This is best shown in FIG. 6 of the drawing. At each corner of the top cover 10 there are eight small holes 22 arranged in the form of a triangle such as shown in FIG. 3. These holes are the same size as holes 16 and are for the purpose of holding the fish which have been caught. The fish are all painted white on the top so that the value of the fish cannot be identified from above. The undersides are painted in different colours which have specific point values to be described later.

It is intended that the several parts of the invention may be dismantled for packing in a suitable container or box.

The object of the game is to score points by catching fish of various point values by introducing a fishing rod into one of the ice holes. The following directions relate a preferred method and set of rules for playing the game.

Each player takes a fishing rod and selects an ice hole through which he intends to fish. The thirty two fish are thoroughly mixed and inserted into the holes around the perimeter of the disc. The top cover is then assembled over the disc and the game is ready for play. The disc is spun by rotating the top of the projecting shaft 13. When the disc comes to rest, an arrow which may be painted on the end of the shaft will point to one of the fishing holes. The player who selected this hole starts the play. He spins the wheel and after it has come to rest, he inserts his rod and extracts the fish which lies beneath his ice hole. He removes the fish and places it in his score box. Other players follow in clockwise rotation. The disc is spun eight times to complete the game, each player taking a turn at spinning the wheel in the same rotation as that used for fishing.

If the Gold fish is caught in the first round the player immediately wins the game and a new game has to be started. Assuming that nobody catches the Gold fish in the first round, then the game continues for eight spins of the wheel and each player adds up the value of their catch according to the following points rule.

| Colour of Fish. | Number of Fish in Game | Points Value of Each Fish. |
| --- | --- | --- |
| Gold | 1 | 1000 |
| Blue | 2 | 500 |
| Red | 3 | 400 |
| Yellow | 5 | 300 |
| Green | 6 | 200 |
| Black | 7 | 100 |
| White | 8 | (¹) |

¹ No Points.

Bonus points may be claimed under the following conditions:

Any player who catches two Blue fish in any two consecutive rounds wins 500 extra points. Any player who catches three Red fish in any three consecutive rounds wins 1000 extra points. The above bonus points are added to the total score.

Penalty points should be subtracted from a player's score under the following conditions:

Any player who catches two White fish in any two consecutive rounds loses 100 points; in any three consecutive rounds 300 points.

The player with the highest score wins. In the case of a tie, one extra round is played by those involved.

While I have illustrated and described my invention with some degree of particularity, I realize that in practice various alterations therein may be made without departing from the spirit of the invention or the scope of what is claimed.

I claim:

A magnetic game comprising, in combination, a base board, a cover having two downwardly sloping side walls removably secured at their lower edges to opposite sides of said base board, a disc having a central shaft pivotally mounted at the centre of the base board and projecting upwardly through said cover to provide means for rotating said disc intermediate the cover and the base board, holes symmetrically spaced around the perimeter of said disc and adapted to loosely receive pins, said pins having enlarged heads formed of magnetic material, each head being marked to represent a different value, said pins further being located in a mixed manner in the holes, larger holes disposed in said cover and spaced symmetrically above the perimeter of the disc, pegs having magnets secured to their lower ends removably engaging with said larger holes such that said pins may be lifted by their enlarged heads successively from said first mentioned holes upon repeated removal of said pegs, and a group of smaller holes disposed in each corner of said cover for storing the pins withdrawn through the larger holes, it being the purpose of the game for each player to have a peg for repeated insertion into one of said larger holes with the object of withdrawing the pins one at a time by magnetic force, and summing their different values.

References Cited in the file of this patent

UNITED STATES PATENTS

| | | |
|---|---|---|
| 866,430 | Carrington et al. | Sept. 17, 1907 |
| 910,769 | Archibald | Jan. 26, 1909 |
| 1,061,864 | Palmer | May 13, 1913 |
| 1,145,417 | Hollien | July 6, 1915 |
| 2,039,332 | Morrill | May 5, 1936 |
| 2,193,948 | Thompson et al. | Mar. 19, 1940 |
| 2,795,427 | Sachs | June 11, 1957 |